US010846379B2

(12) United States Patent
Fink et al.

(10) Patent No.: US 10,846,379 B2
(45) Date of Patent: Nov. 24, 2020

(54) ACCESS KEY FOR A FIELD DEVICE

(71) Applicant: Endress+Hauser Flowtec AG, Reinach (CH)

(72) Inventors: Nikolai Fink, Aesch (CH); Sushil Siddesh, Basel (CH)

(73) Assignee: Endress+Hauser Flowtec AG, Reinach (CH)

( * ) Notice: Subject to any disclaimer, the term of this patent is extended or adjusted under 35 U.S.C. 154(b) by 121 days.

(21) Appl. No.: 16/062,857

(22) PCT Filed: Nov. 15, 2016

(86) PCT No.: PCT/EP2016/077718
§ 371 (c)(1),
(2) Date: Jun. 15, 2018

(87) PCT Pub. No.: WO2017/102211
PCT Pub. Date: Jun. 22, 2017

(65) Prior Publication Data
US 2018/0357397 A1 Dec. 13, 2018

(30) Foreign Application Priority Data

Dec. 15, 2015 (DE) .................. 10 2015 121 861

(51) Int. Cl.
*G06F 21/31* (2013.01)
*H04L 29/06* (2006.01)
*G05B 19/042* (2006.01)

(52) U.S. Cl.
CPC ............ *G06F 21/31* (2013.01); *H04L 63/068* (2013.01); *G05B 19/0423* (2013.01); *G05B 2219/24154* (2013.01); *G05B 2219/24167* (2013.01)

(58) Field of Classification Search
CPC .................. G06F 21/31; H04L 63/068; G05B 2219/24154; G05B 19/0423; G05B 2219/24167
See application file for complete search history.

(56) References Cited

U.S. PATENT DOCUMENTS 6,351,821 B1 2/2002 Voth
2008/0037785 A1 2/2008 Gantman et al.
(Continued)

FOREIGN PATENT DOCUMENTS

CN 1556953 A 12/2004
DE 102013111690 A1 5/2015
(Continued)

OTHER PUBLICATIONS

Search Report for German Patent Application No. 10 2015 121 861.5, German Patent Office, dated Nov. 3, 2016, 9 pp.
(Continued)

Primary Examiner — Nelson S. Giddins
(74) Attorney, Agent, or Firm — Mark A. Logan; Endress+Hauser (USA) Holding Inc.

(57) ABSTRACT

A method for providing an access key for a field device of automation technology, wherein the access key controls accessing of the field device, includes: producing an individual key; storing the individual key in a database together with an identification feature of the field device; storing the individual key in the field device which is to be unlocked based on an input access key; ascertaining at least the identification feature of the field device for which the access key is to be provided; and forming/producing/generating the access key, such that it includes at least one hash value, wherein the hash value is formed at least from the individual key read-out from the database with the assistance of the ascertained identification feature.

17 Claims, 2 Drawing Sheets

(56) References Cited

U.S. PATENT DOCUMENTS

| | | | | |
|---|---|---|---|---|
| 2008/0101613 A1* | 5/2008 | Brunts | .................. | G06F 21/572 380/279 |
| 2012/0089519 A1 | 4/2012 | Peddada | | |
| 2013/0212657 A1 | 8/2013 | Lu | | |
| 2013/0291115 A1 | 10/2013 | Chong et al. | | |
| 2014/0040431 A1 | 2/2014 | Rao et al. | | |
| 2015/0113280 A1* | 4/2015 | Maruyama | ............ | H04L 9/0822 713/171 |
| 2015/0281233 A1* | 10/2015 | Asenjo | .................... | G06F 21/44 726/7 |

FOREIGN PATENT DOCUMENTS

| | | | | |
|---|---|---|---|---|
| DE | 102013227087 A1 | 6/2015 | | |
| EP | 1519276 A1 * | 3/2005 | ............. | G06F 21/31 |
| EP | 1519276 A1 | 3/2005 | | |
| EP | 1916612 A2 | 4/2008 | | |
| JP | 11265318 A | 9/1999 | | |
| JP | 2001092718 A | 4/2001 | | |
| JP | 2001195551 A | 7/2001 | | |
| JP | 2001236333 A | 8/2001 | | |
| JP | 9134330 A | 6/2009 | | |
| WO | 2007128544 A1 | 11/2007 | | |
| WO | 2008108764 A2 | 9/2008 | | |
| WO | WO-2008108764 A2 * | 9/2008 | ........... | H04L 63/062 |
| WO | 2015158388 A1 | 10/2015 | | |

OTHER PUBLICATIONS

Search Report for International Patent Application No. PCT/EP2016/077718, WIPO, dated Jan. 31, 2017, 14 pp.

* cited by examiner

ACCESS KEY FOR A FIELD DEVICE

CROSS-REFERENCE TO RELATED APPLICATIONS

The present application is related to and claims the priority benefit of German Patent Application No. 10 2015 121 861.5, filed on Dec. 15, 2015 and International Patent Application No. PCT/EP2016/077718 filed on Nov. 15, 2016, the entire contents of which are incorporated herein by reference.

TECHNICAL FIELD

The invention relates to a method for providing an access key for a field device of automation technology. Furthermore, the invention relates: to a method for unlocking a field device; to an access key; to a field device; and to a system of automation technology.

BACKGROUND

In process automation technology, same as in manufacturing automation technology, field devices are often applied, which serve for registering and/or influencing process variables. Serving for registering process variables are measuring devices containing sensors, such as, for example, fill level measuring devices, flow measuring devices, pressure- and temperature measuring devices, pH-redox potential measuring devices, conductivity measuring devices, etc., which register the corresponding process variables, fill level, flow, pressure, temperature, pH-value, and conductivity. Serving for influencing process variables are actuators, such as, for example, valves or pumps, via which the flow of a liquid in a pipe or tube section, and the fill level in a container, can be changed.

Referred to as field devices are, in principle, all devices, which are applied near to the process and which deliver, or process, process relevant information. Besides the above measuring devices/sensors and actuators, referred to as field devices are generally also such items, which are connected directly to a fieldbus and which serve for communication with superordinated units, i.e. items such as e.g. remote I/Os, gateways, linking devices and wireless adapters.

A large number of such field devices are produced and sold by the Endress+Hauser group of companies.

In modern industrial plants, field devices are, as a rule, connected with superordinated units via fieldbus systems, such as e.g. Profibus®, Foundation Fieldbus®, HART®, etc. Normally, the superordinated units are control systems, respectively control units, such as, for example, a PLC (programmable logic controller). The superordinated units serve, among other things, for process control, process visualizing, process monitoring as well as for start-up of the field devices. The measured values registered by field devices, especially sensors, are transmitted via the connected bus system to one or, in given cases, also more, superordinated unit(s). Along with that, also a data transmission from the superordinated unit via the bus system to the field devices is required; this serves especially for the configuring and parametering of field devices or for diagnostic purposes. Generally stated, the field device is serviced via the bus system from the superordinated unit.

Besides a wired data transmission between the field devices and the superordinated unit, also wireless data transmission is possible. Especially in the bus systems, Profibus®, Foundation Fieldbus® and HART®, wireless data transmission via radio is specified. Radio, or wireless, networks for sensors are specified in greater detail in the standard, IEEE 802.15.4.

Industrial plants, especially automated plants, are, as a rule, distinguished by very high safety requirements. Safety is especially important in the case of wireless access systems.

Well known from the state of the art are access mechanisms, such as, for example, the input of a password, or access key. These access mechanisms help to assure that only authorized persons can gain access to field device data, especially their parameters, in order, for example, to change, or edit, them. This concerns both the direct accessing of a field device by a human, as well as also the accessing via a tool, such as, for example, a software component.

In order for the case, in which an access key is forgotten, to avoid having to replace a field device, in the present state of the art, a generally valid (i.e. for all field devices of a manufacturer) access key is furnished. If this furnished access key is input to a field device, the field device becomes unlocked and a new individual access key can be stored for the field device. As safety requirements become more stringent for field devices, this solution is now considered to be unsafe, since, at any time, all field devices can be accessed.

SUMMARY

An object of the invention is a safer method, by means of which accessing of a field device is controllable.

The object of the invention is achieved by a method for providing an access key for a field device of automation technology, wherein the access key controls accessing of the field device, especially its parameters, wherein the method comprises steps as follows:
producing an individual key;
storing the individual key in a database, wherein stored together with the individual key in the database is supplementally an identification feature of the field device,
storing the individual key in the field device, which is to be unlocked based on an input access key;
ascertaining at least the identification feature of the field device for which the access key is to be provided;
forming/producing/generating the access key, such that it includes at least one hash value, wherein the hash value is formed at least from the individual key read-out from the database with the assistance of the ascertained identification feature.

The method of the invention enables that, at any time, and as often as desired, an access key can be produced, especially by a field device manufacturer, for a particular field device.

An advantageous form of embodiment of the method of the invention provides that, besides the identification feature, also time information of the field device, for which the access key is to be provided, is ascertained and in the forming/producing/generating a predetermined duration of validity is given the access key.

Especially, the form of embodiment can provide that the time information is derived from a value in an operating hours counter of the field device. By providing the time information, an access key can be produced with a defined validity, or duration of validity.

An advantageous form of embodiment of the method of the invention provides that the time information is converted into a corresponding binary form and is used as a first time stamp, wherein the first time stamp is converted into a second time stamp, in the case of which the predetermined duration of validity is masked out in the form of a bitmask of relevant low valued bits and at least one part of the masked out bits is stored as an offset value and wherein the access key is so formed/produced/generated that it includes at least the predetermined duration of validity in the form of the bitmask or a representative for the bitmask, the offset value and the hash value, wherein the hash value is formed at least from the individual key (read-out from the database with the assistance of the ascertained identification feature) and the second time stamp.

Bitmasks in the field of informatics are bit fields, whose locations represent no information, but, instead, serve to read out and/or to manipulate one or more bit fields.

An advantageous form of embodiment of the method of the invention provides that the offset value is used supplementally for forming the hash value. When the offset value enters into the forming of the hash value, hacking can be resisted.

The object is achieved, furthermore, by a method for unlocking a field device of automation technology by means of an access key, which controls accessing of the field device, especially its parameters, wherein the method comprises steps as follows:
  inputting an access key, which includes at least one hash value;
  calculating/forming a comparison hash value based on an individual key stored in the field device;
  enabling or performing at least one function of the field device, when the comparison hash value agrees with the input hash value of the access key.

An advantageous form of embodiment of the method of the invention provides that the function is resetting a password for access authorization of the field device.

An alternative form of embodiment of the method of the invention provides that the function is accessing parameter values of the field device.

Another alternative form of embodiment of the method of the invention provides that the function is unlocking a software functionality of the field device.

An advantageous form of embodiment of the method of the invention provides that the unlocking or performing of the at least one function is executed for a duration of validity predetermined by the access key.

An advantageous form of embodiment of the method of the invention provides that the unlocking or performing of the at least one function can be performed only during the duration of validity predetermined by the access key.

An advantageous form of embodiment of the method of the invention provides that the access key further includes an offset value and a bitmask or its representative, wherein the comparison hash value is formed based on the individual key stored in the field device, the offset value input by the access key and a third time stamp, wherein the third time stamp is ascertained by subtraction of the offset value from a current value in an operating hours counter and following masking out of the relevant low valued bits based on the bitmask or its representative.

The object is, furthermore, achieved by a field device of automation technology, comprising: an internal memory, in which an individual key is stored, wherein the internal memory is externally inaccessible; and
a computing unit, which is designed to execute or to perform the method for unlocking according to at least one of the above described forms of embodiment.

An advantageous embodiment of the field device of the invention provides that the individual key is stored encrypted in the internal memory of the field device.

Furthermore, the object is achieved by an access key for a field device of automation technology, which access key has at least one hash value, an offset value and a bitmask or its representative.

The object is achieved, furthermore, by a system of automation technology, comprising: a plurality of field devices, in which, in each case, at least one individual key is stored and each of which has a computing unit, which is designed to execute or to perform the method for unlocking according to at least one of the above described forms of embodiment;
a database of a field device manufacturer, in which the individual keys are stored together with, in each case, an identification feature of the field device;
an access key generating unit for providing an access key for field devices of automation technology, wherein the access key generating unit is adapted in such a manner that it can perform the method for providing an access key according to at least one of the above described forms of embodiment.

An advantageous embodiment of the system of the invention provides that the database of the field device manufacturer is arranged removed from the automation plant.

Another advantageous embodiment of the system of the invention provides that the individual keys are stored encrypted in the database.

BRIEF DESCRIPTION OF THE DRAWING

The invention will now be explained in greater detail based on the appended drawing, the figures of which show as follows.

DETAILED DESCRIPTION

Figure 1:
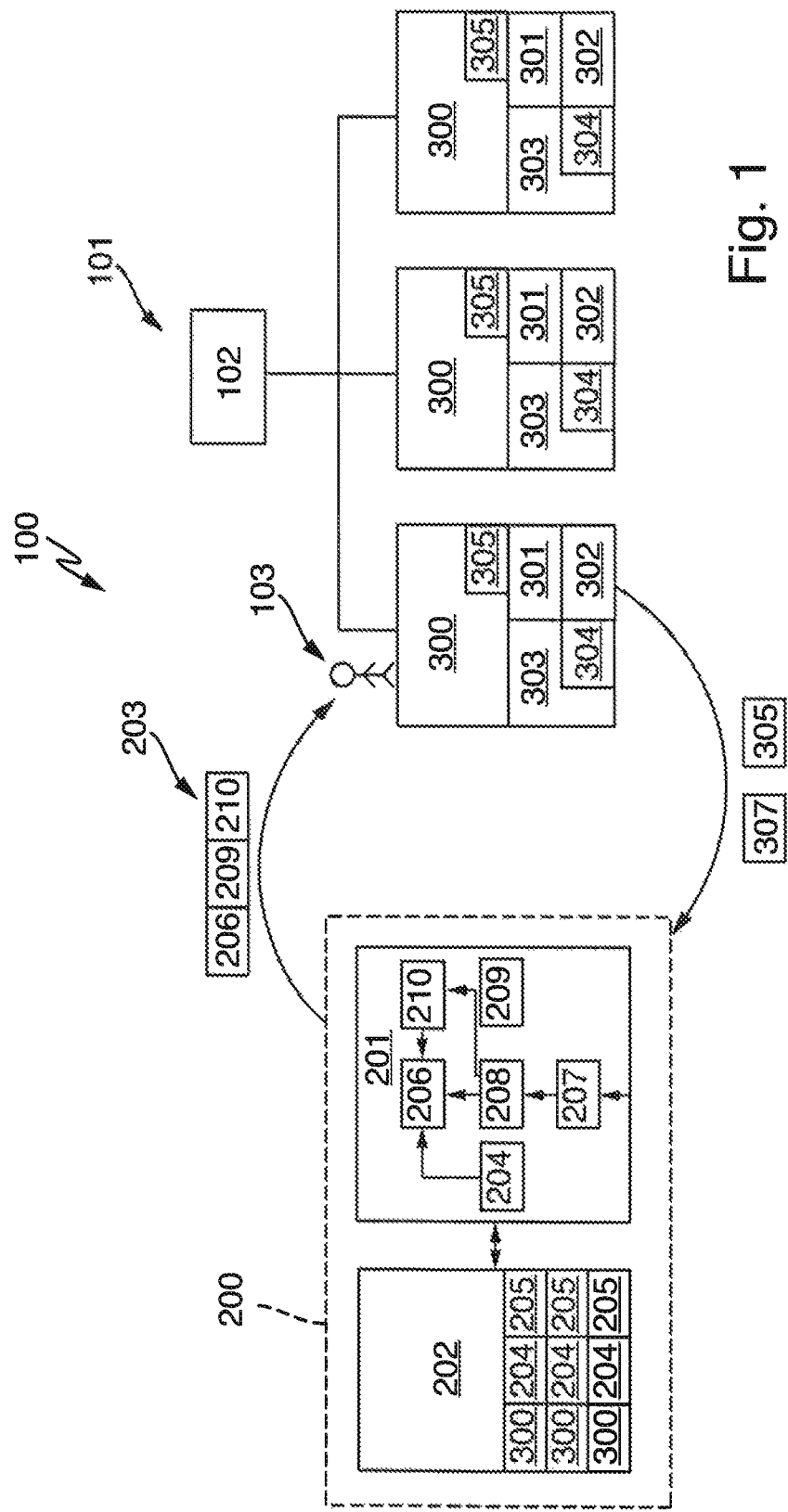
FIG. 1 shows a system of the invention for automation technology.

FIG. 1 shows a system 100 of the invention for automation technology. System 100 includes: an access key generating unit 201 for providing an access key 203; a plurality of field devices 300, each of which has stored at least one individual key 304 and each of which has a computing unit 301; as well as a database 202, in which the individual keys 204 are stored together with, in each case, an identification feature 205 for each of the field devices 300.

With the help of the system 100, access keys 203 can be manufactured, which are valid only for individual field devices. An access key 203 can be produced, for example, by a field device manufacturer 200 and, when required, be transmitted to a user 103 of the field device 300. The user 103 is, in such case, any person, who would like to access the field device 300. Thus, the user 103 can be, for example, a service technician, for instance one in the employ of the plant operator.

In order to execute the method of the invention, it is necessary that each field device 300, which later should be unlockable via an access key 203, be provided with a randomly produced, individual key 304, also called the private key or the secret key. This individual key is stored both in the corresponding field devices 300 as well as also in a database 202. In the database, the serial number is stored supplementally as identification feature 205, so that the individual key 204 can be ascertained based on the identification feature 205. The database 202 is, in such case, preferably run by the field device manufacturer 200 and is located, thus, removed from the automation plant 101, in which the plurality of field devices 300 is located.

The individual key 304 is stored in the field device 300 in an internal memory 303. Key 304 is, in such case, stored in such a manner that it is not capable of being read out and/or overwritable and/or accessible by a user 103. A user 103, thus, has no opportunity to reach the key 304. However, the individual key 304 stored in the field device 300 and incapable of being read out from memory 303 can nevertheless be used by the field device 200, in particular its internal computing unit 301.

In the case, in which a password is lost for such a field device 300, an access key 203 exactly for this field device 300 can be produced by means of the database. This can be made, for example, by the field device manufacturer 200 managing the database 202. For this, the identification feature 305, for example, in the form of the serial number of the corresponding field device, must be transmitted to the field device manufacturer 200.

In order also to time limit the access key 203, i.e. to limit it to a predetermined duration of validity, supplementally a time information 307 of the corresponding field device 300 is transmitted to the field device manufacturer 200. Such a time information 307 can be, for example, the value in an operating hours counter 302 of the field device 300.

Based on the obtained data, the access key generating unit 201 can form, or produce, or generate, the access key 203 according to the following method.

In a first step, the time information 307 is converted into a corresponding binary form, in case the time information is not already present in such form. The time information 307 can already be in binary form as transmitted from the field device 300, so that a conversion is then not necessary. This binary form is used as a first time stamp 207. The conversion into a binary form leads, thus, to a time discretization, so that the predetermined duration of validity can only correspond to, or be predetermined by, the selected time increments. The time increments and, thus, the degree of discretization can, in such case, be selected as desired. Based on the first time stamp 207, a second binary time stamp 208 is produced, which is masked out corresponding to the predetermined duration to the relevant low valued bits by means of a bitmask 209. Furthermore, the masked out part or at least a part of such is as stored an offset value 210 for producing the access key.

Figure 2:
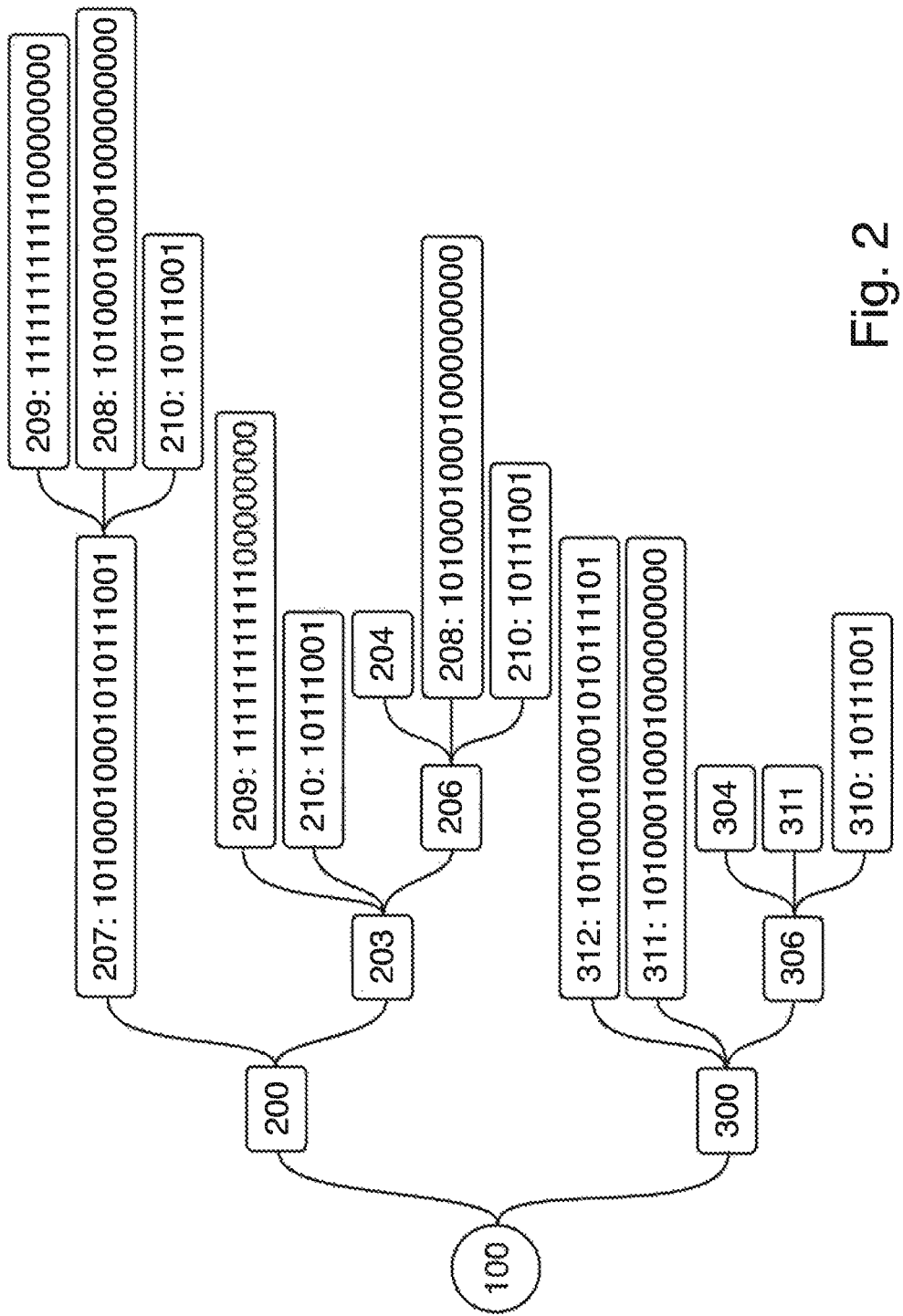
FIG. 2 shows an example of the method of the invention.

This will be explained based on the following example illustrated in FIG. 2. Starting from the first time stamp 207 with the binary value of 1010010010101111001, which corresponds to a time information in the operating hours counter 302 of 664249 hours (this is by way of example; another time could equally as well be represented) at the point in time of the request to the field device manufacturer for the access key, the second, masked time stamp 208 with a binary value of 10100100100000000 is produced by means of the bitmask 209 with a binary value of 11111111111110000000, which corresponds to a predetermined duration of validity of 255 hours. By bitmask 209, thus, the last eight bits, which are relevant for the desired predetermined duration of validity of 255 hours, are masked out, wherein the masked out part with a binary value of 10111001 is stored as offset value 210. The bitmask corresponds, thus, to the predetermined duration of validity negated in the binary format.

In the next step, the time limited access key 203 is generated. For this, a hash value 206 is formed from the individual key 204 ascertained from the database 202 by the serial number, i.e. the identification feature 205, and from the second time stamp 208. Optionally, also the offset value 210 can be taken into consideration for forming the hash value 206. The so formed hash value 206, the bitmask 209 or a representative for such and the offset value 210 are then combined to form to the access key 203. At this point, it is noted that instead of the bitmask 209 also a representative thereof can be used. For this, it is necessary, however, to have a global definition, i.e. one accepted both on side of the field devices as well as also on side of the field device manufacturer. For example, a definition in a simple case could be that a representative "A" means a duration of validity of one day, a representative "B" a duration of validity of two days, etc.

The so produced access key 203 is, thus, specifically generated for a field device and can only be successfully input to this one field device. Due to the time information 307, it can, thus, be provided that the access key 203 can be successfully input to the field device only for the predetermined duration of validity or that after input of the access key 203 to the field device 300, the field device 300 executes a function for the predetermined duration of validity.

In the following, the method, which a computing unit 301 of the field device 300 executes after input of the access key 203, is described.

In a preliminary step executed by the computing unit 301 for calculating a comparison hash value 306, the computing unit 301 accesses the internal memory 303 of the field device 300 to, in order to ascertain the individual key 304 stored there. Likewise for forming the comparison hash value 306, the computing unit 301 ascertains a current value in the operating hours counter 302, i.e. a value at the point in time of the input of the access key. The computing unit 301 masks this value with the bitmask 209 made available by the input access key 203 in the field device 300. In the case, in which via the access key 203 a representative for the bitmask 209 is made available in the field device 300, the computing unit 301 ascertains a bitmask defined for the representative. The masked current value is then taken into consideration as third time stamp 311 together with the individual key 304 and optionally the offset value 310, which was likewise supplied to the computing unit through the input of the access key, for building the comparison hash value 306.

In the following step, the computing unit 301 compares the comparison hash value 306 with the hash value 206 of the input access key 203. In the case, in which agreement is found, the computing unit 301 executes at least one function.

By way of example, the computing unit 301 can execute as a function a resetting of a password of the field device 300, unlock an accessing of parameter values of the field device 300 and/or execute a software functionality with reference to the field device, for example, a "heartbeat software functionality".

Due to the duration of validity given in the access key 203, it can be controlled whether the access key 203 can be successfully input to the field device 300 only for the predetermined duration of validity, e.g. the access key 203 is valid only for the predetermined duration of validity, or whether the executed function is executed only for the predetermined duration of validity and, thus, a time limitation of the executed function occurs.

The invention claimed is:

1. A method for providing an access key for a field device of automation technology, comprising:
    producing an individual key;

storing the individual key in a database together with an identification feature of the field device;

storing the individual key in the field device, which is to be unlocked based on an input of the access key;

ascertaining the identification feature of the field device for which the access key is to be provided; and generating the access key such that it includes at least one hash value, wherein the hash value is formed at least from the individual key read-out from the database using the ascertained identification feature, and wherein the access key controls accessing the field device including parameters of the field device.

2. The method as claimed in claim 1, further comprising:
ascertaining time information of the field device for which the access key is to be provided,
wherein the generating of the access key includes giving a predetermined duration of validity to the access key.

3. The method as claimed in claim 2, wherein the time information is derived from a value in an operating hours counter of the field device.

4. The method as claimed in claim 2, further comprising:
converting the time information into a corresponding binary form as a first time stamp;
converting the first time stamp into a second time stamp;
masking out the predetermined duration of validity using a bitmask of relevant low valued bits; and
storing at least one part of the masked out bits as an offset value,
wherein the predetermined duration of validity is in the form of the bitmask or a representative for the bitmask, the offset value, and the hash value, and
wherein the hash value is formed at least from the individual key and the second time stamp.

5. The method as claimed in claim 4, wherein the offset value is used supplementally for forming the hash value.

6. A method for unlocking a field device of automation technology using an access key, comprising:
producing an individual key;
storing the individual key in a database together with an identification feature of the field device;
storing the individual key in the field device, which is to be unlocked based on an input of the access key;
ascertaining the identification feature of the field device for which the access key is to be provided;
generating the access key such that it includes at least one hash value formed at least from the individual key read-out from the database using the ascertained identification feature, wherein the access key controls accessing the field device including parameters of the field device;
inputting the access key to the field device;
calculating in the field device a comparison hash value based on an individual key stored in the field device;
comparing the comparison hash value with the access key hash value; and
enabling or performing at least one function of the field device when the comparison hash value agrees with the access key hash value.

7. The method as claimed in claim 6, wherein the at least one function includes resetting a password for access authorization of the field device.

8. The method as claimed in claim 6, wherein the at least one function includes accessing parameter values of the field device.

9. The method as claimed in claim 6, wherein the at least one function includes unlocking a software functionality of the field device.

10. The method as claimed in claim 6, wherein the unlocking or the enabling or performing of the at least one function is executed for a duration of validity predetermined by the access key.

11. The method as claimed in claim 6, wherein the unlocking or the enabling or performing of the at least one function can be performed only during a duration of validity predetermined by the access key.

12. The method as claimed in claim 6, wherein the access key further includes an offset value and a bitmask or a representative for the bitmask,
wherein the comparison hash value is formed based on the individual key stored in the field device, the offset value input by the access key, and a third time stamp, and
wherein the third time stamp is ascertained by subtraction of the offset value from a current value in an operating hours counter and following masking out of the relevant low valued bits based on the bitmask or a representative for the bitmask.

13. A system of automation technology, comprising:
a plurality of field devices, each field device including an internal memory in which an individual key is stored and further including a computing unit configured to:
receive an access key including at least one hash value;
control access to the field device based upon an access key;
calculate a comparison hash value based on the individual key;
compare the hash value of the access key with the comparison hash value; and
enable or perform at least one function of the field device when the comparison hash value agrees with the hash value of the input access key;
a database of a field device manufacturer in which the individual keys are stored together with, in each case, an identification feature of the field device; and
receive, by an access key generating unit, an individual key and an identification feature for a field device;
receive, by the access key generating unit, a bitmask or a representative for the bitmask;
calculate, by the access key generating unit, a hash value formed at least from the field device's individual key, the field device's identification feature, an offset value, and the bitmask or the representative for the bitmask;
generate, by the access key generating unit, an access key for the field device, wherein the access key includes the hash value; and
provide, from the access key generating unit, the access key for the field device.

14. The system as claimed in claim 13, wherein the database of the field device manufacturer is arranged removed from the automation plant.

15. The system as claimed in claim 13, wherein the individual keys are stored encrypted in the database.

16. The system as claimed in claim 13, wherein the access key generating unit is further configured to:
receive time information of the field device for which the access key is to be provided;
convert the time information into a corresponding binary form as a first time stamp;
convert the first time stamp into a second time stamp;
mask out a predetermined duration of validity using the bitmask of relevant low valued bits; and
store at least one part of the masked out bits as the offset value,
wherein the hash value is formed additionally with the second time stamp, wherein the predetermined duration of validity is in the form of the bitmask or the representative for the bitmask, the offset value, and the hash value, and wherein the generating of the access key includes giving the predetermined duration of validity to the access key.

17. The system as claimed in claim 16, wherein the hash value is formed additionally with the offset value.

* * * * *